(12) United States Patent
Lee et al.

(10) Patent No.: US 9,591,238 B2
(45) Date of Patent: Mar. 7, 2017

(54) ASYNCHRONOUS READOUT ARRAY

(71) Applicant: Voxtel, Inc., Beaverton, OR (US)

(72) Inventors: Adam Lee, Portland, OR (US); Jehyuk Rhee, King City, OR (US); Brent Jensen, Hillsboro, OR (US); George Williams, Portland, OR (US)

(73) Assignee: Voxtel, Inc., Beaverton, OR (US)

(*) Notice: Subject to any disclaimer, the term of this patent is extended or adjusted under 35 U.S.C. 154(b) by 82 days.

(21) Appl. No.: 14/526,340

(22) Filed: Oct. 28, 2014

(65) Prior Publication Data

US 2016/0057366 A1 Feb. 25, 2016

Related U.S. Application Data

(60) Provisional application No. 62/040,623, filed on Aug. 22, 2014.

(51) Int. Cl.
| | |
|---|---|
| *H04N 5/33* | (2006.01) |
| *H04N 5/374* | (2011.01) |
| *H04N 5/3745* | (2011.01) |
| *H04N 5/378* | (2011.01) |

(52) U.S. Cl.
CPC ............ *H04N 5/33* (2013.01); *H04N 5/378* (2013.01); *H04N 5/3742* (2013.01); *H04N 5/3745* (2013.01)

(58) Field of Classification Search
CPC ...... H04N 5/33; H04N 5/3355; H04N 5/3696; H04N 5/37455; H04N 5/3745; H04N 5/378; H04N 5/3742
See application file for complete search history.

(56) References Cited

U.S. PATENT DOCUMENTS

| | | | |
|---|---|---|---|
| 8,581,168 | B2 | 11/2013 | Linder |
| 2012/0261553 | A1 | 10/2012 | Elkind |

*Primary Examiner* — Twyler Haskins
*Assistant Examiner* — Angel L Garces-Rivera

(57) ABSTRACT

An imaging device is disclosed, the device comprising a pixelated array of semiconductor elements, in which each detecting element is electrically connected to an integrated circuit, the integrated circuit comprising a passive signal path and an active signal path. The passive path provides consecutive frame imaging and the active path detects the location of transient events. The device further comprising a readout decoder block, the readout decoder block controlling operation of the passive paths. Additionally, the device comprises of an address arbitration control block, the address arbitration control block controlling operation of the active paths, wherein the address arbitration control block readout of the active paths are independent of readout of the integrated signal readout from the passive paths.

41 Claims, 7 Drawing Sheets

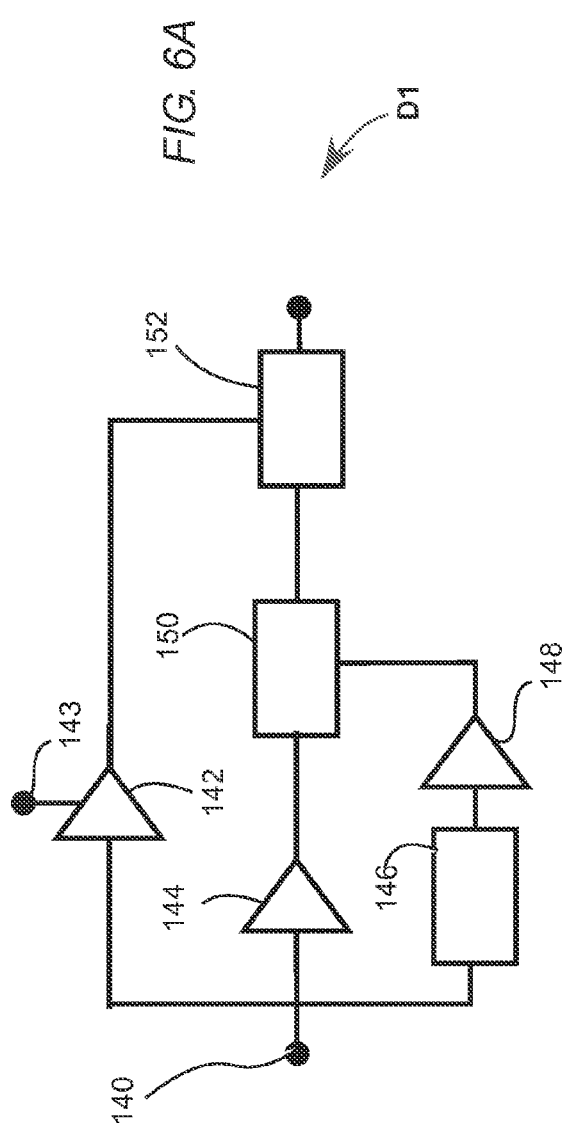
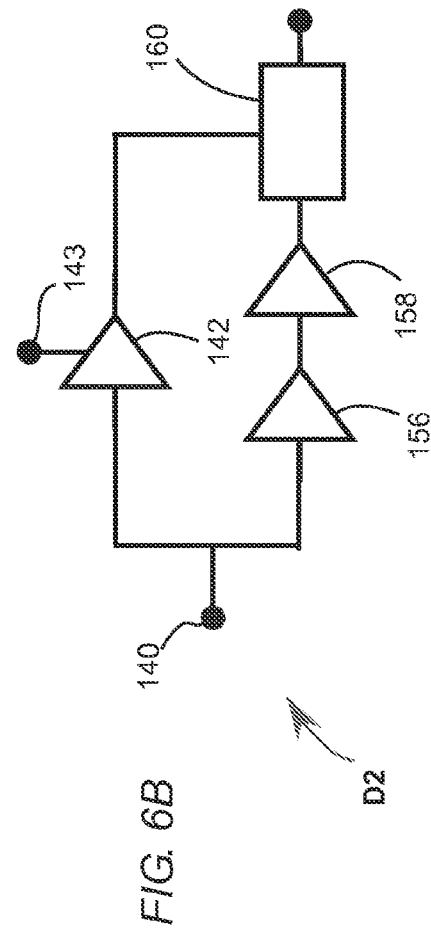
FIG. 6A
FIG. 6B

ASYNCHRONOUS READOUT ARRAY

REFERENCE TO RELATED APPLICATIONS

This application claims priority of U.S. Provisional Application No. 62/040,623, filed on Aug. 22, 2014, and U.S. Provisional Application No. 62/065,508 filed on Oct. 17, 2014.

STATEMENT OF GOVERNMENT INTEREST

This invention was made with government support under contract FA8650-13-C-1501 and FA8651-13-C-0021 awarded by the Air Force Research Laboratory. The government has certain rights in the invention.

TECHNICAL FIELD OF THE DISCLOSURE

The present disclosure relates in general to imaging devices. The disclosure relates in particular to semiconductor imaging devices capable of both passive imaging and transient event detection, such events as those created by laser pulses.

DISCUSSION OF BACKGROUND ART

Photosensitive semiconductor based optical imagers are commonplace. In a semiconductor based imager, an array of pixels each comprise of a photosensitive junction or photodetector. When a photon with sufficient energy is incident upon and absorbed in the structure an electron-hole pair is created. To read resultant current from absorbed photons an amplifier is required. In CMOS devices an active pixel sensor (APS) has an integrated circuit for each pixel in the sensor with the photosensitive junction and amplifier built within the same material. In ultraviolet and infrared devices a readout integrated circuit (ROIC) is commonly used, where the photodetector and ROIC are made on different materials, then bonded.

In order to achieve dual mode functionality within a pixel, such as classic frame rate imaging and high frequency events, advanced APS or ROIC designs must be implemented. One such design is described in U.S. Pat. No. 6,864,965 wherein a switching control allows either readout high resolution at low frame rate or readout of reduced resolution at high frame rates.

Another such apparatus is described in U.S. Publication [US 20120261553 A1] wherein an ROIC is provided which allows for switching between different detection modes. One of the disclosed modes allows for detection of a thermal image and detection of a short laser pulse in a commonly shared readout path. This mode enables capture of a passive image and location of laser events as every frame is readout. This application relates to another approach.

SUMMARY OF THE DISCLOSURE

The present disclosure is directed to imaging devices. In one aspect, an imaging device in accordance with the present disclosure comprises of a pixelated array of semiconductor detector elements, in which each detecting element is electrically connected to an integrated circuit, the integrated circuit comprising a passive signal path and an active signal path. The passive path provides consecutive frame imaging and the active path detects the location of transient events. The device further comprising a readout decoder block, the readout decoder block controlling operation of the passive paths. Additionally the device comprises of an address arbitration control block, the address arbitration control block controls operation of the active paths, wherein the address arbitration control block readout of the active paths is independent of readout of the passive paths.

BRIEF DESCRIPTION OF THE DRAWINGS

The accompanying drawings, which are incorporated in and constitute a part of the specification, illustrate preferred embodiments of the present disclosure. The drawings together with the general description given above and the detailed description of preferred methods and embodiment given below, serve to explain principles of the present disclosure.

FIG. 6A is an electrical diagram of a constant fraction discriminator.

FIG. 6B is an electrical diagram of a differentiating zero crossing discriminator.

DETAILED DESCRIPTION OF THE DISCLOSURE

Figure 1:
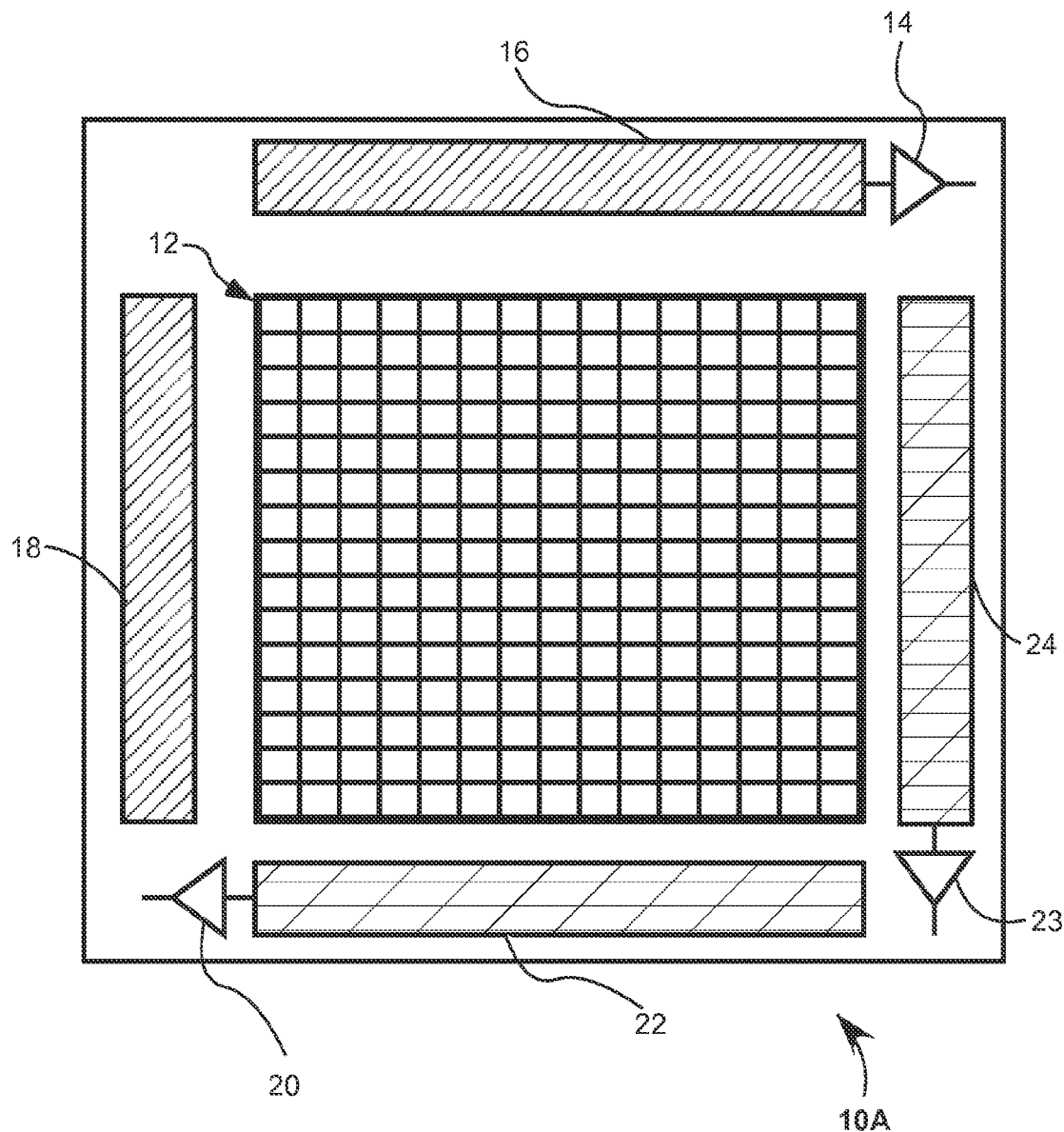
FIG. 1 is a plan view, schematically illustrating a imaging device, the device comprises of a pixelated array of semiconductor detector elements, wherein each detecting element is electrically connected to an integrated circuit, the integrated circuit comprising a passive signal path and an active signal path, a readout decoder block, the readout decoder block controlling operation of the passive paths, and an address arbitration control block, the address arbitration control block controlling operation of the active paths, wherein the active path readout is independent of the passive path readout.

Referring now to the drawings, wherein like components are designated by like reference numerals. Methods and embodiments of the present disclosure are described further herein below.

FIG. 1 schematically illustrates a dual mode imaging device 10A. Device 10A comprises of a pixelated array 12. Each pixel individually is electrically connected to an integrated circuit. The integrated circuit comprises of a passive and an active path. The passive path is operated by a readout decoder block. The readout decoder block comprises of an output port 14, a row decoder 18, and a column decoder 16. Passive path output port 14 may be an analog output or may include an analog-to-digital converter, whereby parallel or serial digital data is output from the port. The passive path allows imaging frame rates at about 60 frames per second.

The active path is operated by the address arbitration control block. The address arbitration control block comprises of a row digital output port 23, a column digital output port 20, a row arbitrator 24, and a column arbitrator 22. Readout of the active path to other circuitry is via row digital output port 23, column output port 20, or combinations thereof as will be discussed further hereinbelow. The digital output ports output row and column information which can be multiplexed to provide the address information. Output port 23 attached to row arbitrator 24 and column out port 20 is attached to column arbitrator 22. The active path detects transient events and provides address information of those events. The address information along with temporal characteristics allow for asynchronous detection, location, and frequency characteristics of transient events, such as laser pulses. The active path and passive path each have dedicated readout, allowing simultaneous passive imaging and active laser detection with asynchronous detection and readout. The pixel array and integrated circuit are discussed in detail further hereinbelow.

Pixelated array 12 is made from a photosensitive semiconductor material referred herein as photodetector material. The photodetector can be made from any photosensitive semiconductor material which can be pixelated, non-limiting examples include germanium (Ge), indium gallium arsenide (InGaAs), indium antimonide (InSb), indium phosphide (InP), mercury cadmium telluride (HgCdTe), silicon (Si) and all crystalline variations of those listed. Each semiconductor type has spectral response which allows detection at various spectral bands from x-ray to infrared. Spectral response of the photodetector materials can be extended or modified by implementation coating and scintillators. Coating include antireflection coating, reflection coating, bandpass, bandstop, shortpass, longpass, notch, and other such spectral filtering and combinations thereof. Scintillators allow up-converting or down-converting of otherwise undetectable wavelengths to wavelengths detectable to the particular photodetector material.

One preferred photodetector material is indium gallium arsenide (InGaAs) with spectral sensitivity from about 900 nanometers (nm) to about 1700 nm. Utilizing InGaAs allows for passive imaging in the near infrared region for low light imaging and allows detection of NIR laser such as neodymium-doped yttrium aluminum garnet (Nd:YAG) at 1064 nm or Er:Glass laser at 1535 nm, or any laser that emits in the NIR, including the so called "eyesafe" spectral ranges longer than 1300 nm, where the radiation is less of an ocular hazard.

When the photodetector material is made from ultraviolet, near-infrared, or infrared sensitive semiconductor material, other than silicon, a separate readout integrated circuit (ROIC) must be manufactured and attached to the pixel array using such methods as solder bump bond hybridization. If the photodetector material is silicon, then the circuit can be integrated within the silicon, referred generally as active pixel sensors (APS), although silicon based devices can also use a separate integrated circuit. The ROIC or the APS can be manufactured with well-known silicon based photolithography techniques such as those developed in CMOS technology.

Figure 2:
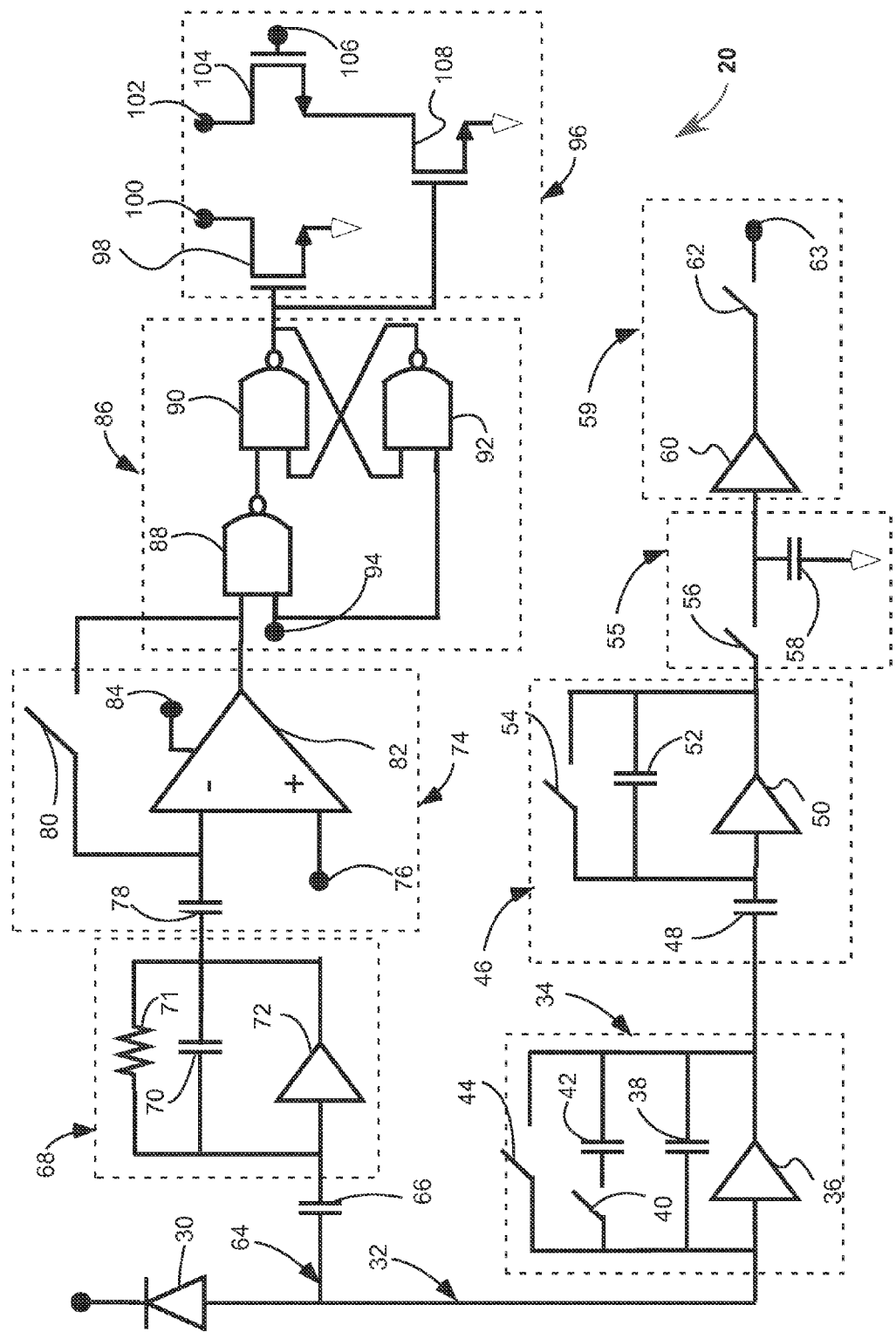
FIG. 2 is an electrical diagram of the integrated circuit of a pixel in the pixel array.

FIG. 2 is an example electrical diagram of the integrated circuits of the present disclosure. Here, one of the photosensitive pixels in the pixel array is represented by a photodiode 30. By way of example, during operation, photodiode 30 is illuminated and provides current flowing through a passive path 32. The direct current and slow current changes are detected by the passive path and fast current changes are detected through the active path.

The passive path provides the imaging device with the about 60 frame rate image. Passive path 32 has a slow charge integrator 34, a noise reduction circuit 46, a sampling circuit 55 and a readout circuit 59. Here, the slow charge integrator is a capacitor transimpedance amplifier (CTIA), although other designs could be implemented such as source follower detector per detector (SFD) or direct injection (DI). Here, CTIA 34 consists of an amplifier 36, in parallel with, a capacitor 38, a switch 40 in series with a capacitor 42, and a reset switch 44. Switch 40 allows increased capacitance in parallel with amplifier 36, thereby decreasing gain of the amplifier and increasing the well capacity of the pixel. CTIA 34 is sufficiently fast to provide image frame of about 60 frames per second but slow enough not to react to fast current changes such as those induced by a laser pulses incident on the photodiode.

A Noise reduction circuit 46 employs correlated double sampling (CDS). Noise reduction circuit 46 has a capacitor 48 in series with the following parallel components: an amplifier 50, a capacitor 52 and a switch 54. Sampling circuit 55 has a switch 56 and a hold capacitor 58. Closing switch 56 passes to CTIA 34 output to hold capacitor 58. Opening switch 56 isolates the signal on hold capacitor 58 from the rest of the circuit. A readout circuitry 59 has a buffer 60, and a switch 62. The readout circuit delivers the signal when row select switch 62 is closed via clocking signals sent from the readout decoder block. When the column is selected via clocking signals from the column decoder, node 63 reads out.

Here the readout routine is standard raster scan readout of the passive path, as will be described operationally further hereinbelow. The particular CDS shown is exemplary of an active CDS, but passive CDS can be implemented without departing from the present disclosure. Likewise either integrate then read (ITR) or integrate while read (IWR) routines can be implemented.

An active path 64 has a AC coupling capacitor 66, a continuous reset CTIA circuit 68, a discriminator 74, a latch circuit 86, and a digital flag readout circuit 96. Coupling capacitor 66 prevents slow changing current to pass, yet allows fast current changes to pass, such as those induced by laser pulses. Continuous reset circuit 68 has a capacitor 70, a resistor 71, and an amplifier 72.

A discriminator 74 has a capacitor 78, a switch 80, a amplifier 82, a calibration input 84 and a voltage threshold 76. Voltage threshold 76 is a user input which can be changed according to the pulse event strength and noise of the system. The voltage threshold is preferably above the noise floor, thereby preventing false triggers and low enough to trigger when actual laser pulses are incident on photodiode 30. Switch 80 and calibration input 84 are used to calibrate the discriminator, measuring and applying the amplifier offset across capacitor 78. When an event occurs above the calibrated threshold the amplifier 82 provides digital output to a latch circuit 86.

Latch circuit 86 receives the digital output from the discriminator and latches to indicate a laser event. Latch circuit has a NAND gate 88 with output to a NAND gate 90. NAND gate 90 and a NAND gate 92 are configured in a cross-coupled configuration resulting in a set-reset latch operation. A reset signal 94 is provided by the column arbitration and provides a signal to both NAND gate 88 and NAND gate 92 allowing reset of the latch circuit, independent of the discriminator output. When a laser event occurs the latch circuit holds thereby flagging the digital flag readout logic circuit, which in turn indicates readout request of the address arbitration control block.

Digital flag readout logic circuit has a row request 100 and a column request 102. Row request 100, an open drain circuit, is flagged by closing a transistor logic 98. Column request 102, another open drain circuit, is flagged by closing a transistor logic 104 and a transistor logic 108. The hold signal from the latch closes transistor logic 98 thereby flagging row request 100. Flagging row request 100 provides temporal information of the event. When the row arbitration decoder sees the flagged row request it performs a row read 106 which closes transistor logic 104, thereby flagging for a column flag readout. After the row readout and column readout the location of the pixel is known.

The combination of the active path and the passive path allows for a simultaneous imaging and transient event detection. The passive path continually rasters providing an image, while the active path asynchronously detects transient events and asynchronously reads out the address information. With collection of the two sets of data, the image and transient events can be overlaid on a display or otherwise logically correspond in output data. The amplifiers of the integrated circuit can be changed via a controller, or shut off, either to conserve energy or disable unwanted pixels. Asynchronous readout of both the active and the passive path will be described further below.

Figure 3:
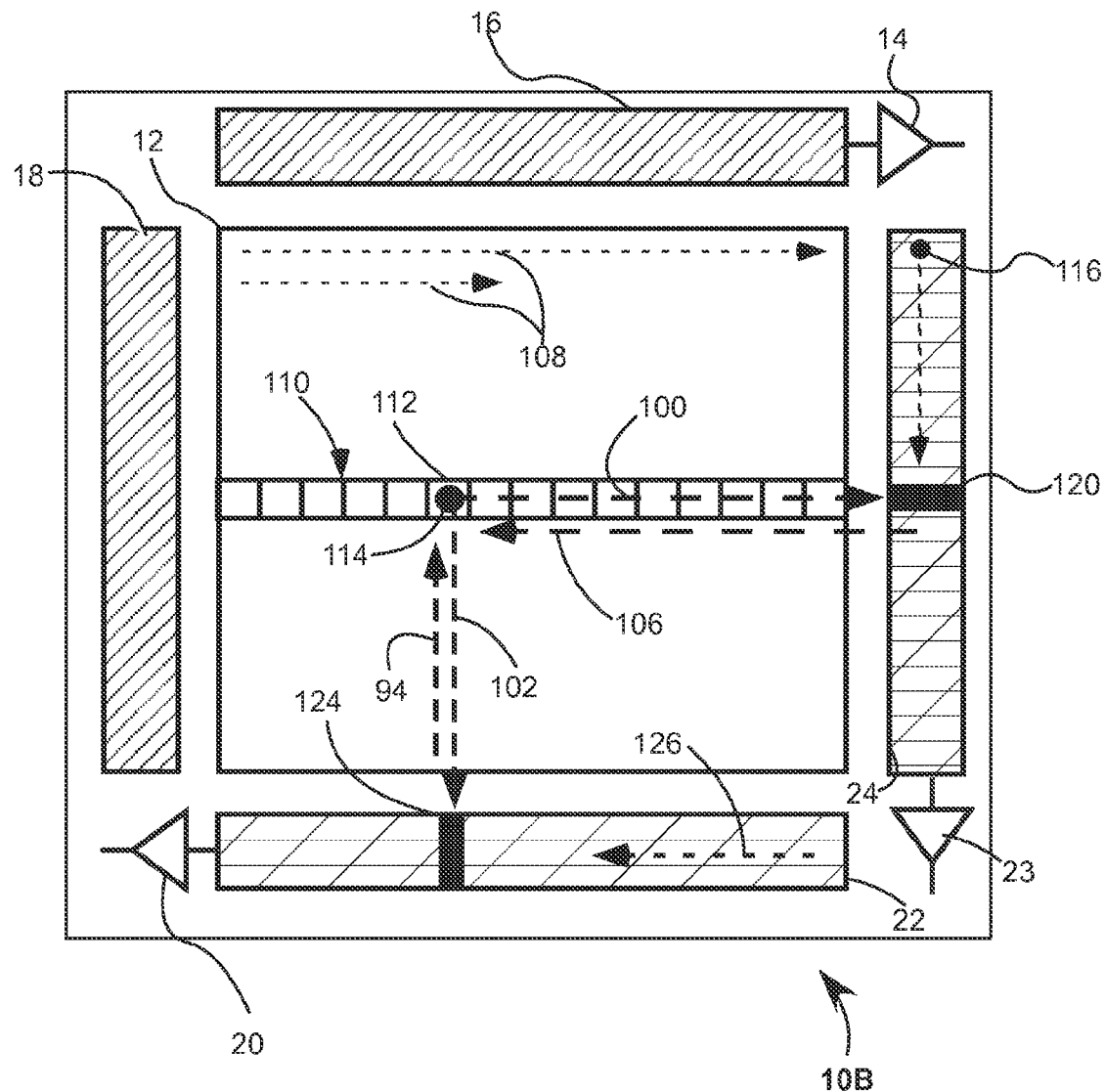
FIG. 3 is a plan view of the dual mode imaging device as that seen in FIG. 1, wherein a single row of pixels is exemplified.

FIG. 3 is a plan view of an imaging device 10B wherein a single row is illustrated for purposes of explaining the passive and active path readout. During operation column decoder 16 and row decoder 18 read out rows of pixels in a raster pattern 108. Timing of the raster readout is clocked by activating a row, then sequentially activating the column, reading each pixel individually. While the row and column decoder are reading out the passive signals or the pixel is integrating, active path row arbitrator is awaiting a flagged row request. At any point during passive imaging a laser pulse or other fast temporal or transient event that occurs will cause a row request in the active path. Here, an exemplary pixel 112 in a row 110 is shown with an incident event 114. As described above, pixel 112 will flag 100 with a row request causing a token 116 to be generated. Alternatively, the row arbitration can be cyclically sequenced. Token 116 continuously advances through row arbitrator 24 until the token reaches a row request 120 of the flagged row. After a valid row address is found the row address is readout. The row arbitration then selects the row for readout using row flag read signal 106. The row readout will flag 102 with a column request, activating column arbitrator 22. Column arbitrator 22 creates a token 126 that advances through the columns until valid column address 124 is found and readout. After the address is found and validated the flag is reset 94 to enable detection of another laser pulse on the pixel. If there are multiple neighboring pixels, for instance, if the laser spot spanned multiple pixels, each pixel address would be sequentially readout.

The active path arbitrators advance at a rate of about a couple hundred picoseconds per row or column. The timing jitter depends on the scan time of the device, which in turn depends on the pixel array size. If only one pixel is flagged in a 640 by 512 InGaAs array the maximum time to scan the array and locate the flag is about 40 ns. Determination of arrival time can be compensated by the location of the signaling pixel because the digital arbitration is deterministic. For instance if tokens are always sent from one end of the row, or the column, then uncertainty in the arrival time can be adjusted based on the location of the pixel from the end of the column, or the row, allowing for calibrated time stamps. In addition to spatial compensation, various tree and hierarchical decoder and arbitration configurations can also increase readout speed and accuracy as is known in the art.

Figure 4:
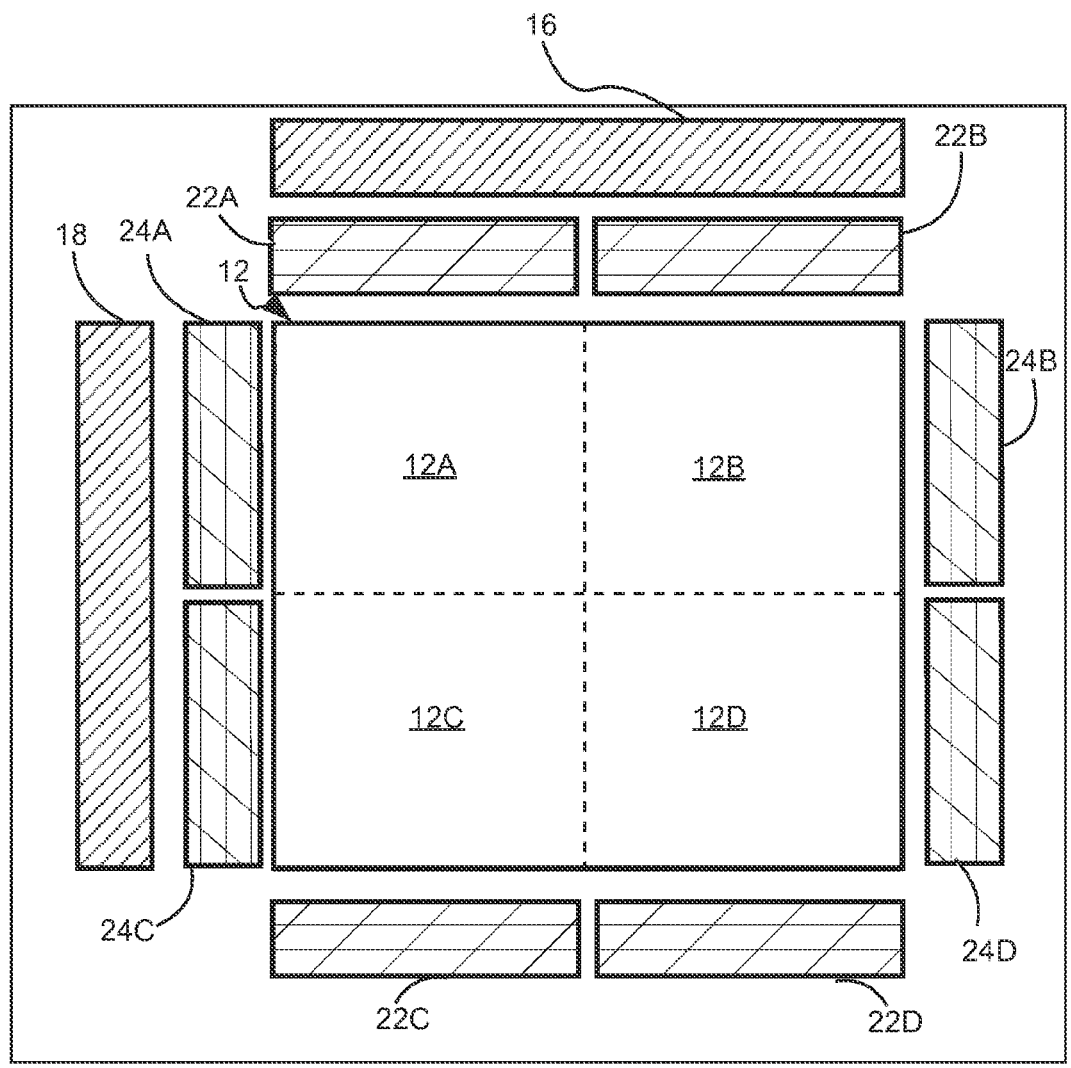
FIG. 4 is a plan view of the dual mode imaging device wherein the address arbitration control block comprises of a plurality of sub-arbitrators.

FIG. 4 is a plan view illustrating an example of different arbitration configurations. FIG. 4 illustrates a device 10C, similar to the device as that shown in FIG. 1, except row arbitrator 24 and column arbitrator 22 each comprise of a plurality of sub-arbitrators. Here, row arbitrator 24 comprises of a sub-arbitrator 24A, 24B, 24C, and 24D. Column arbitrator 22 comprises of a sub-arbitrator 22A, 22B, 22C, and 22D. Pixel array 12 is subdivided into four areas 12A, 12B, 12C, and 12D. Row sub-arbitrator 24A and column sub-arbitrator 22A service pixel area 12A. Row sub-arbitrator 24B and column sub-arbitrator 22B service pixel area 12B. Row sub-arbitrator 24C and column sub-arbitrator 22C service pixel area 12C. Row sub-arbitrator 24D and column sub-arbitrator 22D service pixel area 12D. Operation of each pixel area is substantially the same as described above within each pixel area. In the current configuration, subdividing the arbitration allows for a reduced arbitration area of about 25% and therefore a decrease in jitter time associated with scanning the entire area. The particular configuration, wherein each row and column arbitrator is located next to their serviced pixel area, allows the shortest electrical path from pixel area to arbitrators. Each of the pixel areas are readout asynchronous from another, allowing for multiple transient event detection and readout. Such a configurations can be advantageous when multiple transient events are present in the field of view of the imaging device.

Similarly, the passive decoder can be subdivided for increased readout speed of the entire array. As the passive decoder is clocked, the readout can increase in speed about the same ratio as the area is decreased. For instance, dividing the scanning into 4 areas increases the readout of the entire array by about four times.

Figure 5:
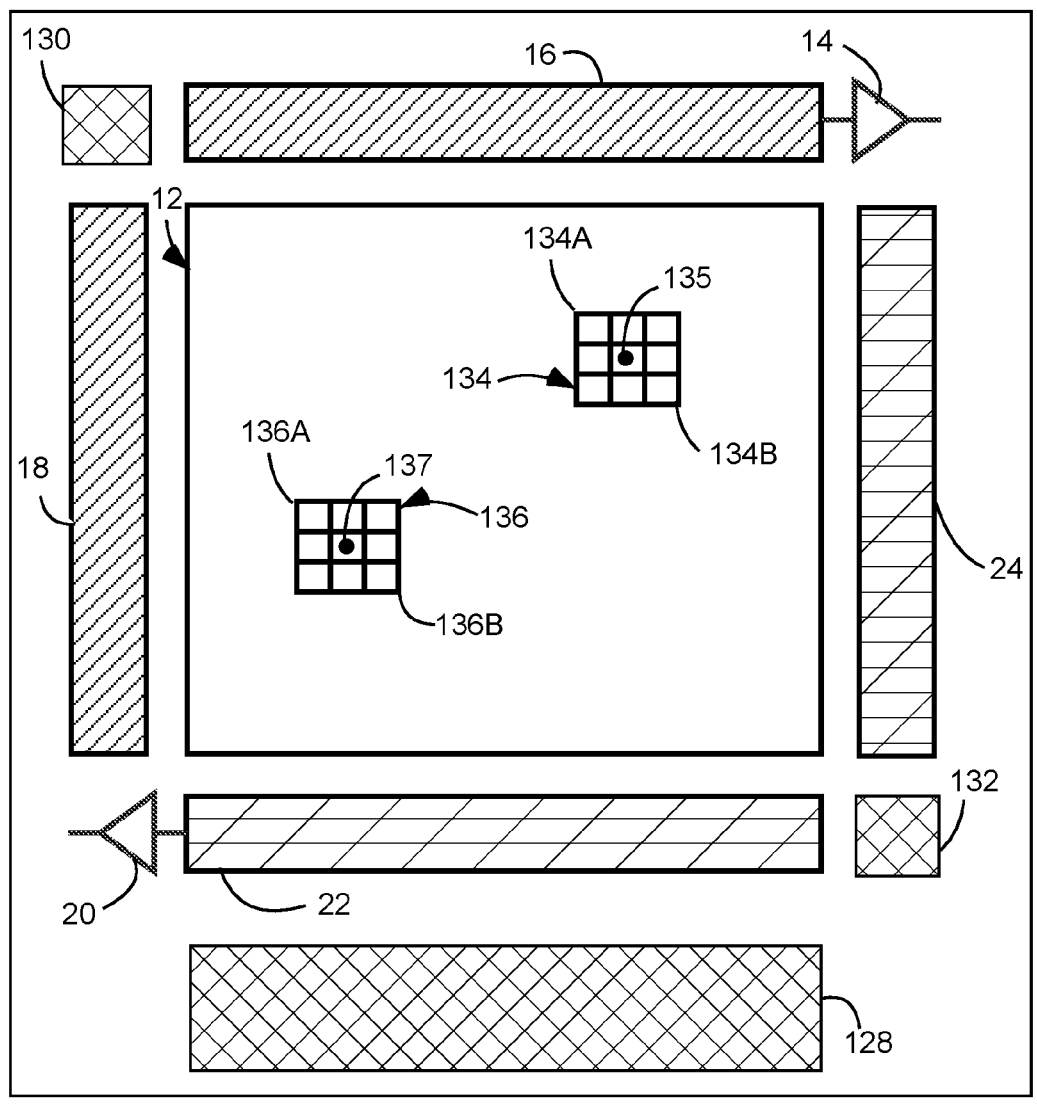
FIG. 5 is a plan view of the device from FIG. 1, further comprising a controller.

FIG. 5 illustrates a device 10D. Device 10D has the same elements as the device shown in FIG. 1 and additionally comprises of a controller 128, a passive control logic 130, and an active control logic 132. The passive control logic and the active control logic can be characterized as part the readout scanner block and address arbitration control block respectively. Here, pixels in a pixel area 134 and a pixel area 136 are exemplified for explanatory purposes. Addition of controller 128 allows advanced functionality of the device such as faster passive framing in certain regions of the pixel array by reading out the passive image in only a subset of the pixels. For instance, if a transient event 135 is detected within one of the pixels in pixel area 134, then controller 128 can modify the passive control logic 130 such that the start and stop pixels in the raster are a pixel 134A and a pixel 134B, respectively. This reduced area or region-of-interest can be read out at a faster rate. In this configuration the passive image readout would be limited to pixel area 134, while the active paths would continue to asynchronously operate. If another transient event 137 is detected at another pixel area 136, then a second region-of-interest could optionally read out with the raster a start and a stop pixels 136A and 136B, respectively.

The controller is on-chip logic which can be integrated within the device circuitry. The controller can be characterized as a digital integrated circuit, microprocessor, microcontroller, processor, or digital signal processor. The controller can be fixed or field programmable.

The controller also allows logical coupling with other optic devices. For example, a laser or laser designator operation can be coupled with the device with the controller. For ranging information the controller can coordinate the emission of a laser pulse with the active path receipt of a laser pulse. For use as a laser rangefinder, controller 128 can use the signal from column flag event line 102 in the active path of a pixel, as shown in FIG. 2 and FIG. 3, to provide a time-to-digital circuit 140 with a receipt reflection from an object while also obtaining the address.

For more accurate ranging data or temporal data the signal readout must be quick. In order to achieve faster readout, the signal from row request 100 can be used bypassing the column readout, this allows faster response, but if more than one pixel in the array detects a transient event the ranging information may not be traceable to the exact pixel. Alternatively, the signal from the discriminator can be fanned out directly from the discriminator circuit output to a time-to-digital converter. Fanning out of the pixels or a portion of the pixels allows the signal to bypass the rest of the circuitry which provides address data, but increases temporal accuracy. In practice routing constraints allow only a portion of the pixels can be fanned out. In this configuration the temporal data will be the most accurate.

In addition to controlling the passive region-of-interest and active path ranging, the controller can change integration time of the passive pixels. For instance the integration time of the pixels can be stopped early or started later for shortened integration times. This technique can be useful when imaging through semi-transparent media and obscurations. For instance obscurations such as rain, clouds, fog, smoke, dust, and certain glasses can saturate the passive imager during integration periods. Illuminating the area with wavelengths transparent or semi-transparent to such obscurations, yet still detectable by the photodetector material, allow imaging through the obscurations. By shortening the integration time, less of the unwanted background noise from the obscurations will be detected and with sufficient illumination, objects and scene data imagery can be obtained. In addition, ranging information which identifies objects through the obscurations can provide feedback for the controller to adjust the integration time based on the distance to the target and illumination.

In either of the aforementioned configurations and methods, implementation of a more accurate discriminator circuit will reduce range walk error of return signals. Range walk error is the error associated with signals of various amplitude. FIG. 6A and FIG. 6B are two possible circuits which can be employed in the discriminator circuit shown in FIG. 2 to reduce range walk error. When using a simple threshold discriminator, pulses of different amplitudes trigger at different positions of the rising edge which lead to time-of-arrival errors. For example, a larger signal may trigger before a smaller signal in a simple threshold discriminator since the rising edge approaches the threshold voltage sooner than a smaller signal.

FIG. 6A is an example of a constant fraction discriminator (CFD). The CFD circuit triggers based on the constant fraction of the total peak height. This allows triggering independent from the peak amplitude thereby giving more accurate timing and reducing range walk. The pulse signal enters the CFD circuit at 140. If the pulse voltage is at a threshold 143, then a leading edge discriminator 142 will trigger. The signal also enters an attenuator 144 in parallel with both a signal delay 146 and an inverting amplifier 148. Both the attenuated signal and inverted signal are input to a summation block 150 such that a constant bipolar signal is produced regardless of the amplitude of the original pulse. The bipolar signal is gated with the output of a discriminator 142 in a logic 152.

FIG. 6B is an example of a zero cross discriminator D2. The zero cross discriminator has leading edge discriminator 142 will trigger as long as the signal is over threshold 143, similar to that shown in FIG. 6A. In parallel, a first amplifier 156 differentiates the charge accumulated by the signal, and then a second differentiator 158 takes the second derivative. The second derivative provides a zero crossing corresponding with the peak of the original pulse. The zero crossing signal is gated with the output of a discriminator 142 in a logic 160.

Figure 7:
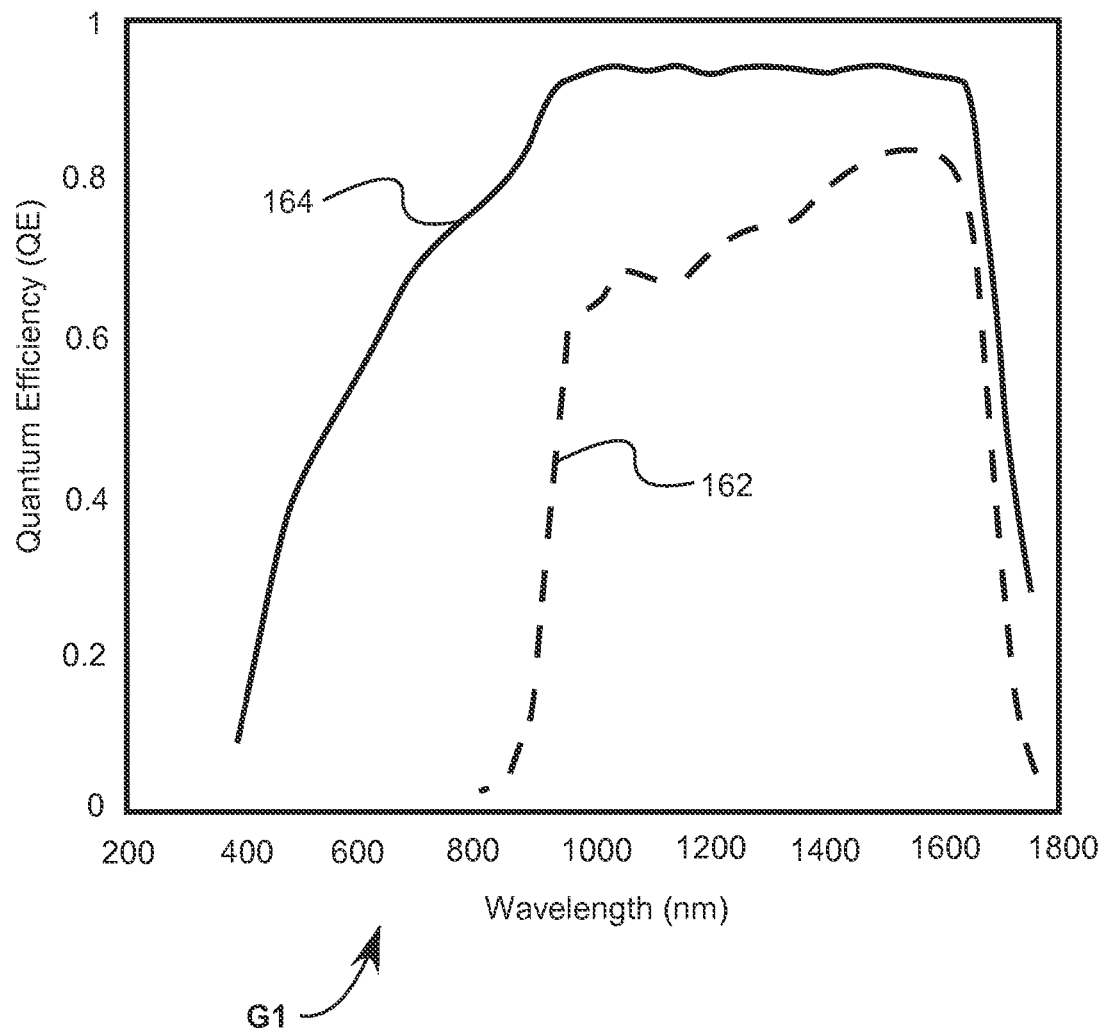
FIG. 7 is a graph showing the quantum efficiency of indium phosphide.

Other methods to increase spectral performance of the device, in addition to the aforementioned material types, coating, and scintillators, is based on the material thickness. The thickness of the photodetector material will have an effect on the spectral range of the imaging device based on the photodetector absorption length. Back thinning or wafer removal techniques allow for increased spectral response for materials which have a short absorption length in the desired spectral range. Alternatively, thick substrates are desirable when the absorption length of the photodetector material is long. By way of example, FIG. 7 shows a graph G1, which contains quantum efficiency curves of InGaAs. The indium phosphide (InP) substrate can be thinned from the InGaAs array causing spectral response extension to shorter wavelengths. Back thinning extends the short wavelength response from about 900 nm to about 500 nm, which allows response to different scene spectral content and detection of additional laser wavelengths. A InP wafer quantum efficiency (QE) spectra 162 is shown as the dashed line with quantum efficiency from about 900 nm to about 1700 nm. A back thinned InP QE spectra 164 has extended quantum efficiency to about 500 nm. Likewise, silicon can be back-thinned for increased ultraviolet response.

Additional techniques to increase performance of the device is reduction of noise. Noise can be reduced by implementing pixel disable logic and cooling. Pixel disable logic allows noisy pixels to be eliminated from reading out. Cooling decreases dark current of the photodetector material. Cooling can be achieved by heat exchangers such as fins, fans, thermoelectric coolers (TEC), coolant pumping, or reservoirs carrying colds liquids, such as a liquid nitrogen dewar. For instance, when InGaAs photodetector material is used with thermoelectric cooling (TEC), or other equivalent cooling methods, dark current noise is decreased by about half with every 7° of cooling.

The disclosed imaging device has a variety of useful application. In general it can be used in any application in which normal frame rate image and a transient event must be located. Specific applications include imaging of laser pointers, rangefinding, and detection of friendly and hostile target designator presence, while simultaneously collecting imaging information. The passive and active image can be displayed on a monitor, overlapping the data from each. In one implementation the imaging device can be coupled with a laser pointer or designator and provide position feedback to the object targeted by a laser pulse. Likewise, the imaging device can be used to coordinate target handoff from person to person or vehicle to vehicle. The imaging device can also provide feedback for laser pointer or laser designator optical stabilization. Timing resolution of the imaging device is fine enough to discriminate pulse repetition frequency (PRF) codes and provide sufficient resolution to obtain ranging information when paired with a controller and time-of-flight circuitry.

From the description of the present disclosure provided herein one skilled in the art can design the imaging devices in accordance with the present disclosure. For instance one skilled in the art could use SPICE software to simulate and verify designed circuitry. Other design software and chip layout with software is available from a variety of suppliers such as Cadence Design Systems, Tanner EDA, Silvaco, Inc., Synopsys, Inc., and Mentor Graphics Corp. Coordination of design and fabrication can be accomplished at any commercial semiconductor integrated circuit fab, integrated device manufacturers, or pure-play semiconductor foundries.

While the present disclosure has been described in terms of particular photodetector materials, circuitry, and operational logic, others can be implemented without departing from the disclosure. In summary, the present invention is described above in terms of particular embodiments. The invention, however, is not limited to the embodiments described and depicted herein. Rather, the invention is limited only by the claims appended hereto.

What is claimed is:

1. A dual mode electro-optical radiation imaging device, the device comprising:
   a pixelated array of semiconductor detector elements, in which each detecting element is electrically connected to an integrated circuit, the integrated circuit comprising a passive signal path and an active signal path, wherein the active signal path triggers readout upon transient event detection;
   a readout decoder block, the readout decoder block controlling operation of the passive paths; and
   an address arbitration control block, the address arbitration control block controlling readout and operation of the active path, wherein the address arbitration control block operates independent and asynchronous to the readout of the passive path, and wherein transient event detection initiates the identification of the location of and readout of the signaling active path.

2. The device of claim 1, wherein the pixelated array is made from indium gallium arsenide (InGaAs).

3. The device of claim 1, wherein the pixelated array is made from silicon.

4. The device of claim 3, wherein the device circuits and detector elements are made within the same substrate.

5. The device of claim 1, wherein the pixelated array is thinned to less than 500 microns thickness and optical radiation enters the device from the side opposite from that containing circuits.

6. The device of claim 1, wherein the device provides gain to the optical signal through an impact ionization process within the detector material.

7. The device of claim 1, wherein the circuits of the device are fabricated using CMOS processing.

8. The device of claim 1, wherein the active path integrated circuitry is optimized for detecting signals generated by pulsed electro-optical radiation sources, including lasers.

9. The device of claim 1, wherein the active path signal path is optimized for detecting electro-optical pulses from an x-ray source.

10. The device of claim 1, wherein the active path detection threshold level is adjustable.

11. The device of claim 1, wherein the address arbitration control block outputs the address representing the centroid of a group of adjacent pixels detecting events.

12. The device of claim 1, wherein the gain-bandwidth properties of the passive signal paths is adjustable, individually or in aggregate.

13. The device of claim 1, wherein the passive path includes a capacitive transimpedance amplifier (CTIA).

14. The device of claim 1, wherein the active path includes a circuit, such as a constant fraction discriminator, for correcting variations in event timing resulting from variations in signal amplitude.

15. The device of claim 1, wherein the address arbitration control block is comprised of a plurality of independent asynchronous sub-arbitrators electrically connected to different portions of the pixel array for the purpose of reducing the time required to determine address locations of events.

16. The device of claim 1, wherein the address arbitration control block reads out active path signals based on a multi-level hierarchy of processing elements such that processing of signals occurs faster.

17. The device of claim 1, wherein the readout scanner block is comprised of plurality of sub-decoders, the sub-decoders electrically connected to the passive paths of the pixels of a separate sub-section of the pixel array, the sub-decoders reading out through separate outputs from the other sub-sections of the array such that time required to readout the passive signals from the pixelated array is decreased.

18. The device of claim 1, wherein the operation of the row or column arbitration circuit logic is initiated by detection of an event in the active channel of a pixel or pixels in the array.

19. The device of claim 1, wherein the logic of the row or column arbitration circuits is sequenced continually while the device is imaging.

20. The device of claim 1, wherein the detector is sensitive to electromagnetic radiation regions in the ultraviolet, visible, near-infrared, short infrared, mid-infrared, long infrared, and combinations thereof including laser-lines within those regions.

21. The device of claim 1, wherein the imaging device further comprises a processor or controller.

22. The device of claim 21, wherein the controller is used to disable the passive path circuitry of a pixel.

23. The device of claim 21, wherein the passive paths are disabled.

24. The device of claim 21, wherein the controller is used to disable the active path circuitry of a pixel.

25. The device of claim 21, wherein the controller processes information from the address arbitration control block to determine the position of objects in the field of view reflecting or emitting pulsed electro-optical energy.

26. The device of claim 21, wherein the device is coupled with an electromagnetic radiation source.

27. The imaging device of claim 26, wherein the electro-optical radiation source is a pulsed laser.

28. The device of claim 21, wherein the device further comprises a timing circuit used to capture the timing of events detected in the active signal path from one or more pixels of the array.

29. The device of claim 28, wherein the timing circuit is used to determine the timing of outputs from the address arbitration control block.

30. The device of claim 28, wherein the timing of events detected in the active signal path is used to determine the time of flight of pulsed electro-optical radiation returned to the device.

31. The device of claim 28, wherein the timing of events detected in the active signal path is used to determine the time between each of a sequence of electromagnetic pulses.

32. The device of claim 31 wherein the time is used to deduce distance to an object reflecting the pulsed electro-optical radiation.

33. The device of claim 28, wherein the events captured are used to determine a laser pulse frequency.

34. The device of claim 21, wherein the data from both the active paths and the passive paths are used to track a target emitting or reflecting electro-optical radiation.

35. The device of claim 21, wherein the data from the active paths and the passive paths is used to orient the output of the optical radiation from a laser.

36. The device of claim 21, wherein the start or end of the passive path signal integration time of one or more pixel elements is calculated based on the time of events detected in the active path of one or more of the pixel elements.

37. The device of claim 21, wherein one or more pixel elements are readout from the passive path signal based on the address of events detected in the address arbitration control.

38. The device of claim 21, where in the controller allows a plurality of programmable operating modes, the modes determining the row and column origin of the active signal paths.

39. The device of claim 21, wherein one or more symbols are superimposed at one or more addresses of the display of the passive path information, wherein the symbols represent range information obtained from return pulses detected in the active path of the respective pixel at that address.

40. The device of claim 21, wherein one or more symbols are superimposed at one or more addresses of the display of the passive path information, wherein the symbols correspond to the range deduced for objects detected in the respective active path at that address.

41. The device of claim 21, wherein one or more symbols are superimposed on the display of the passive path information, wherein the symbols represent the pulse repetition frequency of an optical events detected in the respective active path.

\* \* \* \* \*